United States Patent
Yorwarth et al.

(10) Patent No.: US 6,550,558 B2
(45) Date of Patent: Apr. 22, 2003

(54) RADIATOR MOUNTING

(75) Inventors: Graeme J. Yorwarth, Canvey Island (GB); William P. Starkey, Mayland (GB); Martin Davies, South Woodham Ferrers (GB)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/954,949

(22) Filed: Sep. 18, 2001

(65) Prior Publication Data

US 2002/0079150 A1 Jun. 27, 2002

(30) Foreign Application Priority Data

Sep. 26, 2000 (GB) .............................................. 0023521

(51) Int. Cl.7 .............................................. B60K 11/04
(52) U.S. Cl. ......................... 180/68.4; 16/2.1; 248/609; 165/69
(58) Field of Search ................................ 180/68.4, 68.6, 180/299, 300; 165/67, 69; 248/608, 609, 596; 16/2.1

(56) References Cited

U.S. PATENT DOCUMENTS

| | | | | |
|---|---|---|---|---|
| 3,929,201 A | * | 12/1975 | Hoffman ..................... | 180/68.4 |
| 4,121,682 A | * | 10/1978 | Schaal et al. ............... | 180/68.4 |
| 4,139,053 A | * | 2/1979 | Schaal ........................ | 180/68.4 |
| 4,519,467 A | * | 5/1985 | Saunders .................... | 180/68.4 |
| 4,538,697 A | * | 9/1985 | Muroi et al. ................ | 180/68.4 |
| 4,579,184 A | * | 4/1986 | Hiramoto .................... | 180/68.4 |
| 4,651,839 A | * | 3/1987 | Isobe .......................... | 180/68.4 |
| 4,770,234 A | * | 9/1988 | Hiraoka et al. ............. | 180/68.4 |
| 5,005,883 A | * | 4/1991 | Guiler ......................... | 180/68.4 |
| 5,215,157 A | * | 6/1993 | Teich .......................... | 180/68.4 |
| 5,544,714 A | * | 8/1996 | May et al. .................. | 180/68.4 |
| 5,758,860 A | * | 6/1998 | Hanazaki et al. ........... | 180/68.4 |
| 5,785,140 A | * | 7/1998 | Suzuki et al. .............. | 180/68.4 |
| 6,260,609 B1 | * | 7/2001 | Takahashi ................... | 180/68.4 |
| 6,349,928 B1 | * | 2/2002 | Ko .............................. | 180/68.4 |
| 6,412,581 B2 | * | 7/2002 | Enomoto et al. ........... | 180/68.4 |

* cited by examiner

Primary Examiner—Brian L. Johnson
Assistant Examiner—Jeffrey J. Restifo
(74) Attorney, Agent, or Firm—John William Stader; Rebecca L. Henkel

(57) ABSTRACT

A method of mounting a radiator onto a support member in a vehicle includes the steps of securing to the radiator a resilient mounting bush having a first annular groove in its outer surface, providing a second annular groove in the inner surface of a radiator mounting bore formed in the support member, positioning a spring clip in one of the two annular grooves and inserting the bush into the bore, the spring clip being compressed radially during insertion of the bush into the bore and being released when the annular grooves are axially aligned with one another to lock the bush within the bore.

7 Claims, 2 Drawing Sheets

RADIATOR MOUNTING

BACKGROUND OF THE INVENTION

The present invention relates to the mounting of a radiator on the chassis of a vehicle and is particularly applicable to vehicles, such as tractors, where access to the opposite side of the support member onto which the radiator is to be mounted is restricted.

The chassis in a tractor is commonly formed by the engine block and transmission housing. A bolster or front support member is secured to the front end of the engine and forms a structural part of the chassis which projects forward of the engine block. This bolster may be used to attach an implement to the front end of the tractor and often carries heavy blocks to weigh down the front end of the tractor.

The bolster is also used to support the radiator of the engine cooling system. For this purpose, bores are provided in the bolster and the radiator is secured by means of bolts that are screwed from the underside of the bolster into legs of the radiator.

A difficulty encountered in mounting a radiator in this manner is caused by the fact that the bolster is located above the front axle of the tractor. Access to its underside, to allow the bolts to be screwed into the radiator legs, is severely restricted by the front axle and this precludes the use of power tools. As a result, mounting the radiator on its support member in a tractor has hitherto proved to be a cumbersome and time-consuming task.

SUMMARY OF THE INVENTION

With a view to mitigating the foregoing disadvantage, the present invention provides in accordance with a first aspect, a method of mounting a radiator onto a support member in a vehicle, which comprises the steps of securing to the radiator a collar having a reduced diameter portion or a groove that defines a shoulder facing towards the radiator, providing a groove or reduced diameter portion in the inner surface of a radiator mounting bore formed in the support member to define a second shoulder facing away from the radiator, positioning a spring clip against one of the shoulders on the collar and the bore and inserting the collar into the bore, the spring clip being compressed radially during insertion of the collar into the bore and being released after full insertion of the collar into the bore to abut both shoulders and prevent withdrawal of the collar from the bore.

In its broadest aspect, the invention proposes mounting a radiator on the support member using a locking mechanism analogous to those adopted in security seals that are used to prevent tampering with shipping containers and trailers. Such seals, one example of which is described in U.S. Pat. No. 5,005,883, have a metal bolt which can be inserted into a lock body and once so inserted cannot be separated from the lock body. The bore in the lock body has an internal groove within which there sits a spring clip. The end of the bolt is tapered so that as it is inserted into the lock body, the spring clip expands into the groove and does not impede insertion of the bolt. The bolt also has a groove on its outer surface which on reaching the spring clip releases compression forces on the latter. The spring clip then expands and prevents withdrawal of the bolt from the lock body.

This form of secure fixing is used in the present invention to allow a radiator to be mounted on its support member by assembling retaining collars on the legs or mounting points of the radiator and then pushing the collars into the bores in the support member until the spring clips engage. This simple operation does not require access to the opposite side of the support member for the purpose of assembling the radiator on the support member.

To hold the radiator in place, it is only necessary to prevent it from being pulled out of the bore in the support member and for this purpose it suffices to have just two opposed shoulders straddling the spring clip. However, in order to retain the spring clip in position, it is preferred for one of the shoulders to be defined by means of a groove slightly wider than the spring clip. It is still further preferred for both shoulders to be defined by grooves only slightly wider than the spring clip as this allows the spring clip to prevent movement of the radiator in both directions.

Though the radiator cannot be pulled away from the support member, if the retaining collar is bolted onto the radiator then the radiator can be removed from the support member by unbolting the collar from the radiator. This allows the radiator to be separated from the support member while leaving the collar in place. Such removal would require tool access to the opposite side of the support member.

In accordance with a second aspect of the invention, there is provided a method of mounting a radiator onto a support member in a vehicle, the method comprising the steps of securing to the radiator a resilient mounting bush having a first annular groove in its outer surface, providing a second annular groove in the inner surface of a radiator mounting bore formed in the support member, positioning a spring clip in one of the two annular grooves and inserting the bush into the bore, the spring clip being compressed radially during insertion of the bush into the bore and being released when the annular grooves are axially aligned with one another to lock the bush within the bore.

In this aspect of the invention, the mounting collar forms part of a resilient mounting bush serving to absorb shocks and vibrations. Resilient mounts and bushes have been used to support radiators on vehicle bodies and examples of such mounts are shown for example in U.S. Pat. No. 4,519,467 or U.S. Pat. No. 5,785,140. In its second aspect, the invention succeeds in combining the advantages of a resilient mounting with ease of assembly and mounting.

According to a further aspect of the invention, there is provided a vehicle having a radiator mounted on a support member, wherein the radiator is fitted with a retaining collar having a first annular groove in its outer surface, the support member has a radiator mounting bore within which the retaining collar is received, the wall of which mounting bore is formed with a second annular groove, and a spring clip engages within both grooves to prevent the radiator from being separated from the support member.

Advantageously, the collar is the outer collar of a resilient bush which additionally comprises an inner sleeve and a rubber molding separating the inner sleeve from the outer collar.

The rubber molding is preferably shaped to make direct contact additionally with the radiator body and the wall of the bore in the support member. It is further preferred to interpose a washer between the end of the inner sleeve and the head of a bolt or a nut serving to secure the retaining collar to the radiator and to shape the rubber molding to make direct contact with the washer.

These and other objects, features and advantages are accomplished according to the instant invention by providing a method of mounting a radiator onto a support member in a vehicle including the steps of securing to the radiator a resilient mounting bush having a first annular groove in its outer surface, providing a second annular groove in the inner surface of a radiator mounting bore formed in the support member, positioning a spring clip in one of the two annular grooves and inserting the bush into the bore, the spring clip being compressed radially during insertion of the bush into the bore and being released when the annular grooves are axially aligned with one another to lock the bush within the bore.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
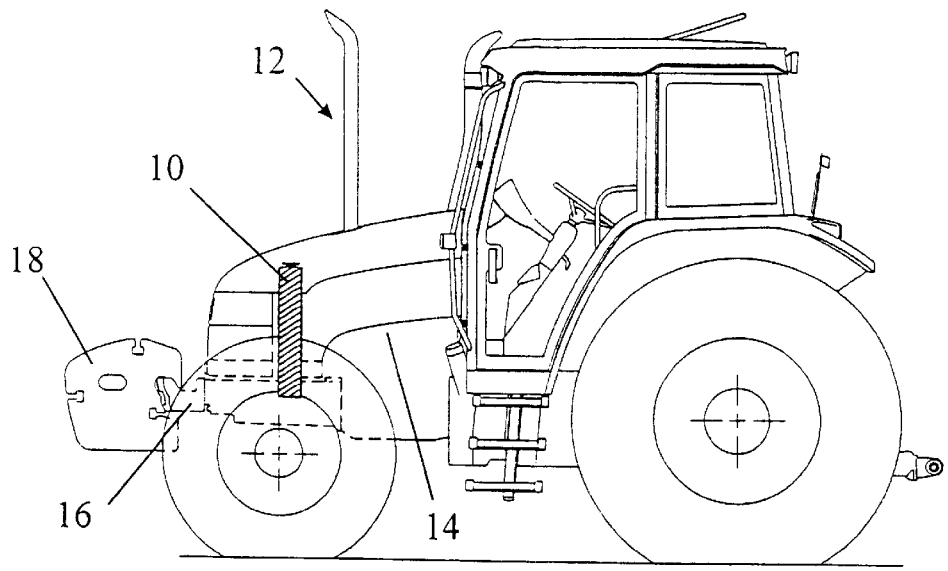
FIG. 1 is a side view of a tractor showing the location of the radiator.
Figure 2:
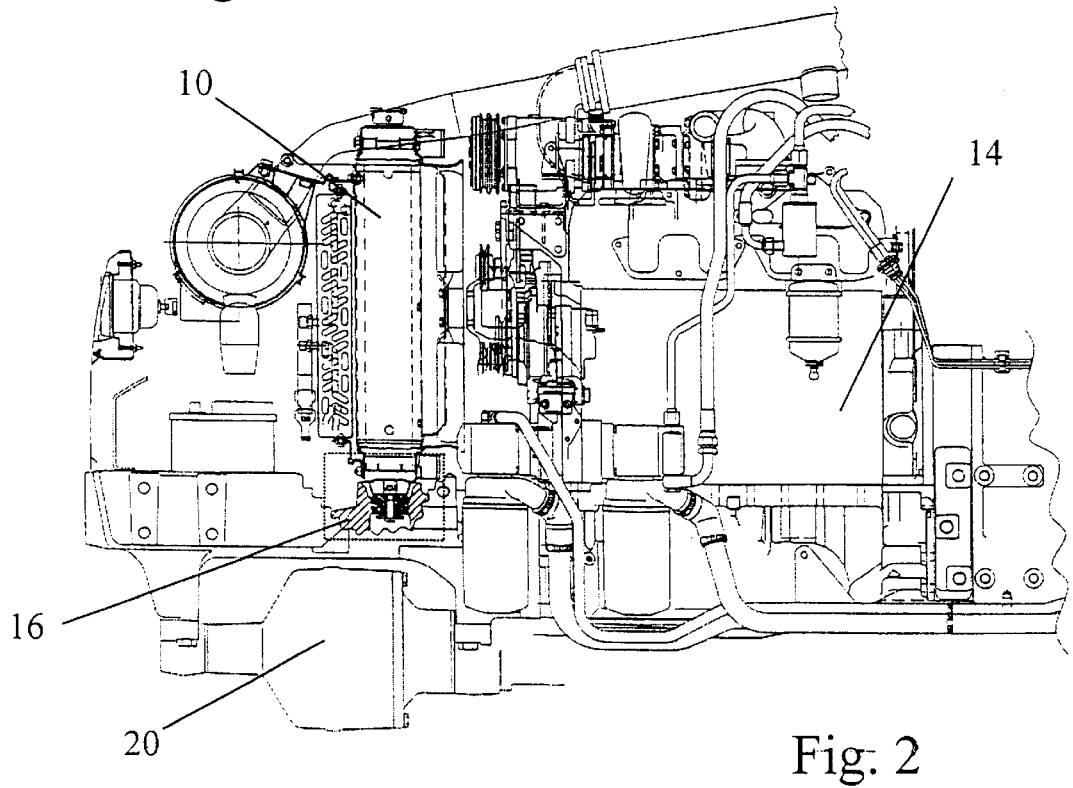
FIG. 2 is a schematic partly cut-away side elevation of the engine compartment of the tractor shown in FIG. 1.

FIGS. 1 and 2 show the manner in which a radiator 10 is mounted in a tractor 12. The chassis of the tractor 12 is formed by the engine block 14 and transmission housing. A bolster or front support member 16 is secured to the front end of the engine block 14 and forms a structural part of the chassis which projects forward of the engine block 14. This bolster 16 may be used to attach an implement to the front end of the tractor 12 and often carries heavy blocks 18 to weigh down the front end of the tractor 12.

The bolster 16 is also used to support the radiator 10 of the engine cooling system. For this purpose, bores are provided in the bolster 16 and conventionally the radiator would be secured by means of bolts that are screwed from the underside of the bolster into legs of the radiator 10.

A difficulty encountered in mounting a radiator in this conventional manner is caused by the fact that the bolster 16 is located above the front axle 20 of the tractor. Access to its underside, to allow the bolts to be screwed into the radiator legs, is severely restricted by the front axle 20 and this precludes the use of power tools. As a result, mounting the radiator on the bolster 16 in a tractor 10 has hitherto proved to be a cumbersome and time consuming task.

To mitigate this problem, the invention provides a mounting that allows the radiator 10 to be dropped into position from above. The mounting of the preferred embodiment of the invention is shown within the frame drawn in dotted lines in FIG. 2, this part of the drawing being shown to a much enlarged scale in FIG. 3.

Figure 3:
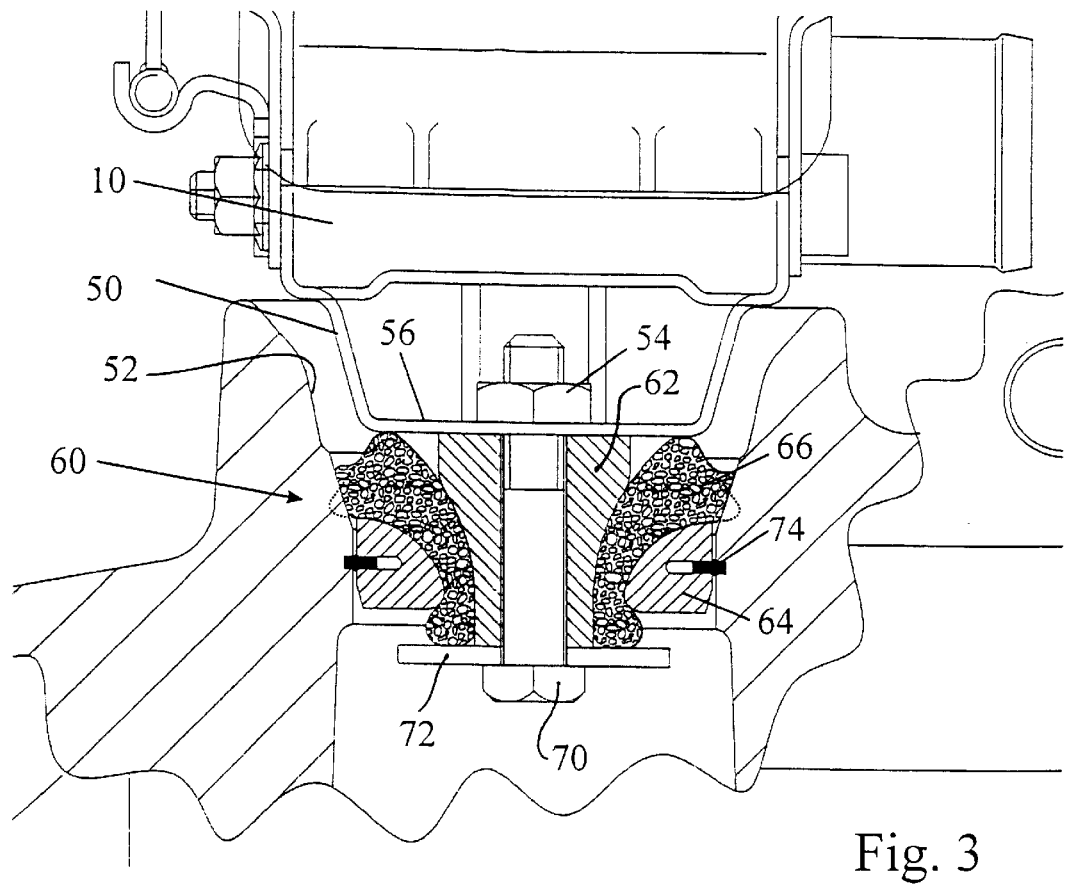
FIG. 3 shows to a much enlarged scale a detail of FIG. 2 framed in dotted lines.

FIG. 3 shows just one leg 50 of the radiator 10 mounted in a bore 52 in the bolster 16. The radiator has two (or more) legs 50, each of which is formed by a U-shaped bracket welded to the lower tank of the radiator 10 and has a nut 54 welded to the upper surface of the base 56 of the bracket.

A mounting bush 60 is fitted to each leg 10 of the radiator before it is introduced into the bolster 16. The bush 60 comprises a central metal sleeve 62 and an outer retaining collar 64 separated from one another by a rubber molding 66 which acts to absorb shocks and prevent vibrations. The bush is secured to the leg 50 by means of a bolt 70 and a washer 72.

The outer retaining collar 64 is formed with a circumferential groove 68 within which there is placed a spring clip 74. The natural outer diameter of the spring clip 74 is greater than that of the narrower section of bore 52 and its inner diameter is smaller than the outer diameter of the collar 64. The clip 74 is not continuous around the circumference of the collar 64 but can be compressed to lie entirely within the annular groove 68 surrounding the collar 64.

After the bushes 60 have been bolted on to the legs 50 of the radiator 10, the bushes 60 are pushed into the bores 52 in the bolster 16. The bores 52 have a conically tapering mouth which has the effect of compressing the spring clip 74 as the bush 60 is lowered in the bore 52.

The bush 60 continues to penetrate into the bore 52 until the groove 68 in the collar 64 becomes axially aligned with the corresponding groove in the wall of the bore 52. At this point, the clip 16 springs out into the position shown in FIG. 3 and prevents the retaining collar 64, from being withdrawn from the bore 52.

This locking is permanent and the collar 64 cannot be removed from the bolster 16 without damage to one or other of the collar 64 and the bore 52. Should the radiator 10 need to be removed for any reason, unscrewing the bolt 70 will allow the radiator 10 to be raised from the support member while leaving the bush 60 in place. Of course, removal of the bolt 70 and its re-insertion upon replacement of the radiator 10 can only be carried out in the conventional manner from the underside of the bolster 16.

Figure 4:
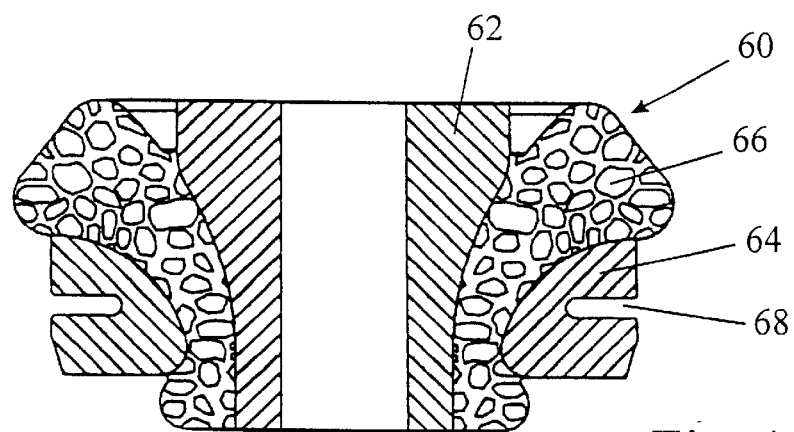
FIG. 4 is a section through the resilient radiator mounting bush shown in FIG. 3 prior to installation.

While the rubber molding 66 could be a cylindrical body sandwiched between the inner sleeve 62 and the outer collar 64 of the bush 60, it is preferred to form it in the manner illustrated in FIG. 4. In FIG. 3, the rubber molding is shown in its compressed state and a relaxed state is shown in dotted lines to indicate the manner in which it is compressed after the bush 60 has been inserted in the bore 52.

It will be seen that, when installed, the rubber molding makes contact with the foot 50 of the radiator 10. This provides additional compression damping and support of the radiator and also helps the molding to remain in contact with the bore 52.

The direct contact of the molding 66 with the bore 52 reduces noise and vibration by restricting relative movement between the bush 60 and the bolster 16. This contact also restricts the movement of the retaining collar 64, thus allowing the width of the groove within the bore 52 to be large or to be formed only by one shoulder. Lastly, the contact of the molding with the bore 52 provides additional resistance as the radiator, with its busses attached is pushed into the bores 52 in the bolster 16.

The rubber molding additionally makes contact with the washer 72 to provide rebound damping. The washer 72 also serves to prevent the radiator 10 from separating from the bolster 16 if the rubber molding should fail.

The bush 60 is made by placing a retaining collar 64 and a conically tapering sleeve 62 within a die, the cavity of which is then filled with a suitable elastomer, for example a vulcanized rubber of type M170-60. The vulcanization process bonds the molding 66 to the two metal parts 62 and 64 to form a unitary bush 60.

It is possible to provide the base 56 of the leg 50 with an annular projection or ring on its side facing the bush 60 to surround the sleeve 62. Such a ring would assist in centering the bush 60 relative the foot 50 during initial assembly and for reinstallation of a radiator during servicing.

It will be clear to the person skilled in the art that various modifications may be made to the described preferred embodiment without departing from the scope of the invention as set forth in the appended claims. In particular, it is not essential to form grooves in both the collar and the support member, it suffices for there to be a shoulder on the collar facing the radiator and another on the bore facing in the opposite direction. Furthermore, the molding 66 need not be a single molding and could for example be constituted by a two rubber bodies separated by a washer, the latter defining the shoulder that prevents the radiator from being separated from the support member.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a wheel-supported chassis formed by an engine drivingly connected to a transmission, an operator's station affixed to the chassis, a power transfer mechanism interconnecting the transmission to a front axle, the front axle located generally below and at least partially forwardly of the engine, and a bolster affixed to the engine and extending away from the engine adjacent to and at least partially above the front axle, the improvement comprising:

at least two vertical apertures through said bolster spaced apart across the front of the engine, each said aperture having a generally conical-shaped upper portion and a generally constant diameter lower section, each said aperture further having a horizontal annular groove in said lower section;

a radiator having a bottom edge with at least two spaced-apart generally u-shaped legs thereon, each leg having an hole through the bottom of the u-shaped portion with a nut affixed to the inside thereof, the at least two legs located to generally align with the at least two apertures through said bolster;

a bushing for each leg, each bushing having a rigid tube-like sleeve with a generally flat top surface and generally flat opposing bottom surface and a central bore therethrough, said sleeve being generally symmetrical about the longitudinal axis of said bore and having an outer surface that includes a tapered section spaced slightly from said top surface and extending toward said bottom surface over which the diameter of said sleeve is reduced, top to bottom, to form a smooth partially curved outer surface; an elastomeric molding affixed to said tapered section of said sleeve, said molding being generally symmetrical about said sleeve and extending from said bottom surface of said sleeve toward the top surface thereof and flaring upwardly and outwardly away from said sleeve at the point of maximum diameter of said sleeve to a diameter greater than the diameter of said aperture, said molding varying in thickness; a ring-like collar with a generally vertical outside edge and a curved inner surface, the diameter of the inside of the collar being larger than the diameter of said sleeve and said generally vertical outside edge has a diameter less than the diameter of said aperture, said outside edge having an annular horizontal groove therearound; said collar affixed to said molding and positioned on said sleeve and said molding generally adjacent said tapered section of said sleeve;

a washer; a headed bolt extending through said washer and said central bore of said sleeve and in threaded engagement with said nut in said leg; and a spring clip is fitted in the annular grooves in said collar and said aperture; the length of said sleeve, the amount of flare on said molding, and the relative diameters of said aperture and said collar being such that said molding is compressed against said aperture, said leg and said washer to form a solid, yet shock absorbing connection between the radiator and the bolster.

2. The improvement of claim 1, wherein:

said sleeve and said collar are metallic.

3. The improvement of claim 2, wherein:

said spring clip is semi-circular and washer-like in shape.

4. The improvement of claim 3, wherein:

said spring clip is metallic.

5. The improvement of claim 4, wherein:

said molding is comprised of type M170-60 vulcanized rubber.

6. The improvement of claim 5, wherein:

said sleeve, said molding and said collar are formed into a unitary structure by a vulcanization process.

7. A method of mounting a radiator onto a support member of a tractor comprising the steps of:

providing at least one aperture through said support, said aperture having a generally conical-shaped upper portion and a generally constant diameter lower section, each said aperture further having a horizontal annular groove in said lower section;

providing a radiator having a bottom edge with at least one generally u-shaped leg thereon, said leg having a hole through the bottom of the u-shaped portion with a nut affixed to the inside thereof, said leg located to generally align with said at least one aperture through said support;

providing a bushing for said at least one leg, said bushing having a rigid tube-like sleeve with a generally flat top surface and generally flat opposing bottom surface and a central bore therethrough, said sleeve being generally symmetrical about the longitudinal axis of said bore and having an outer surface that includes a tapered section spaced slightly from said top surface and extending toward said bottom surface over which the diameter of said sleeve is reduced, top to bottom, to form a smooth partially curved outer surface; an elastomeric molding affixed to said tapered section of said sleeve, said molding being generally symmetrical about said sleeve and extending from said bottom surface of said sleeve toward the top surface thereof and flaring outwardly and upwardly away from said sleeve at the point of maximum diameter of said sleeve to a diameter greater that the diameter of said aperture, said molding varying in thickness; a ring-like collar with a generally vertical outside edge and a curved inner surface, the diameter of the inside of the collar being larger than the diameter of said sleeve and said generally vertical outside edge has a diameter less than the diameter of said aperture, said outside edge having an annular horizontal groove therearound; said collar affixed to said molding and positioned on said sleeve and said molding generally adjacent said tapered section of said sleeve;

providing a washer and headed bolt and inserting said bolt through said washer, said central bore through said sleeve and threading it into said nut in said leg;

tightening said bolt to so that said bushing is rigidly attached to said leg;

providing a washer-like spring clip sized to fit fully into said annular groove in said collar when in a retracted position and to simultaneously fit partially into each of said annular grooves in said collar and said aperture when in a locking position;

putting said spring clip into said annular groove in said collar;

pushing said bushing into said aperture causing said spring clip to move into said retracted position and then to move into said locking position whereby said molding is compressed against said aperture, said leg and said washer to form a solid, yet shock absorbing connection between the radiator and the bolster.

* * * * *